(12) United States Patent
Nakai et al.

(10) Patent No.: US 7,209,031 B2
(45) Date of Patent: Apr. 24, 2007

(54) OBSTACLE DETECTING APPARATUS AND METHOD

(75) Inventors: Hiroaki Nakai, Tokyo (JP); Nobuyuki Takeda, Tokyo (JP); Hiroshi Hattori, Tokyo (JP); Kazunori Onoguchi, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/384,314

(22) Filed: Mar. 21, 2006

(65) Prior Publication Data

US 2006/0182312 A1    Aug. 17, 2006

Related U.S. Application Data

(62) Division of application No. 10/387,465, filed on Mar. 14, 2003, now Pat. No. 7,091,837.

(30) Foreign Application Priority Data

Mar. 29, 2002    (JP)    ............... 2002-097627

(51) Int. Cl.
*B60Q 1/00*    (2006.01)
(52) U.S. Cl. ............... 340/435; 340/425.5; 340/902; 340/436; 367/99; 367/112
(58) Field of Classification Search .............. 340/435, 340/937, 425.5, 933, 436, 901, 902, 903; 701/300, 28, 1, 28.1; 342/61, 70; 367/99, 367/107, 112
See application file for complete search history.

(56) References Cited

U.S. PATENT DOCUMENTS 5,694,483 A * 12/1997 Onoguchi ................ 382/154
6,057,754 A * 5/2000 Kinoshita et al. ........... 340/435
6,114,951 A   9/2000 Kinoshita et al.
6,819,779 B1  11/2004 Nichani
6,963,661 B1 * 11/2005 Hattori et al. ............... 382/154

FOREIGN PATENT DOCUMENTS

| JP | 8-329397    | 12/1996 |
|----|-------------|---------|
| JP | 10-505176   | 5/1998  |
| JP | 2000-293893 | 10/2000 |
| JP | 02000293693 A | 10/2000 |
| JP | 2001-76128  | 3/2001  |

* cited by examiner

*Primary Examiner*—Daniel Wu
*Assistant Examiner*—Daniel Previl
(74) *Attorney, Agent, or Firm*—Oblon, Spivak, McClelland, Maier & Neustadt, P.C.

(57) ABSTRACT

An obstacle detecting apparatus includes an image input unit for receiving images inputted respectively from a plurality of image pick-up devices and accumulating the input images, a feature calculating unit for calculating predetermined, specific feature quantities in the respective accumulated images, a feature comparing unit for comparing the feature quantities, and a result judging unit for judging the presence or absence of an obstacle on the basis of the comparison result. The obstacle detecting apparatus can thus detect an obstacle present on the road by distinguishing the obstacle from a mere object causing no obstruction to driving of the vehicle.

4 Claims, 9 Drawing Sheets

Fig. 4
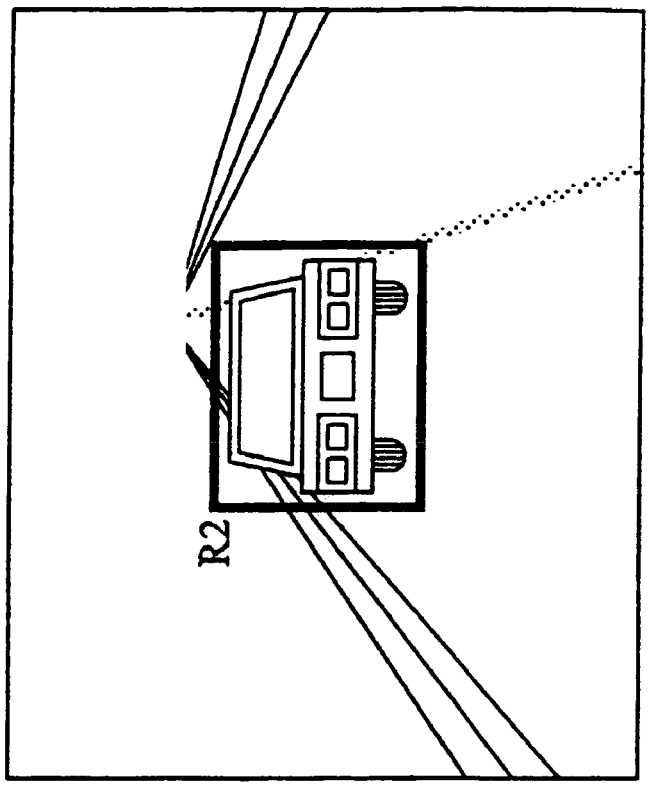
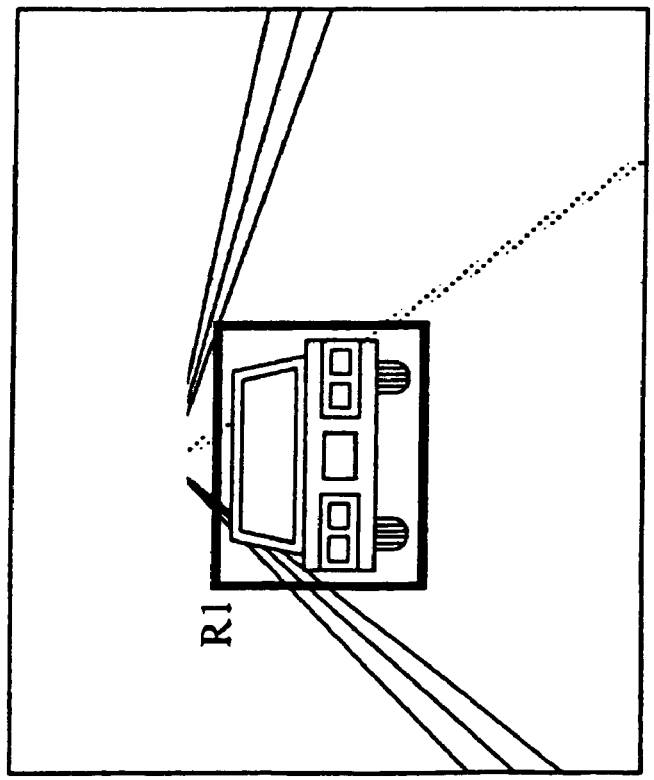

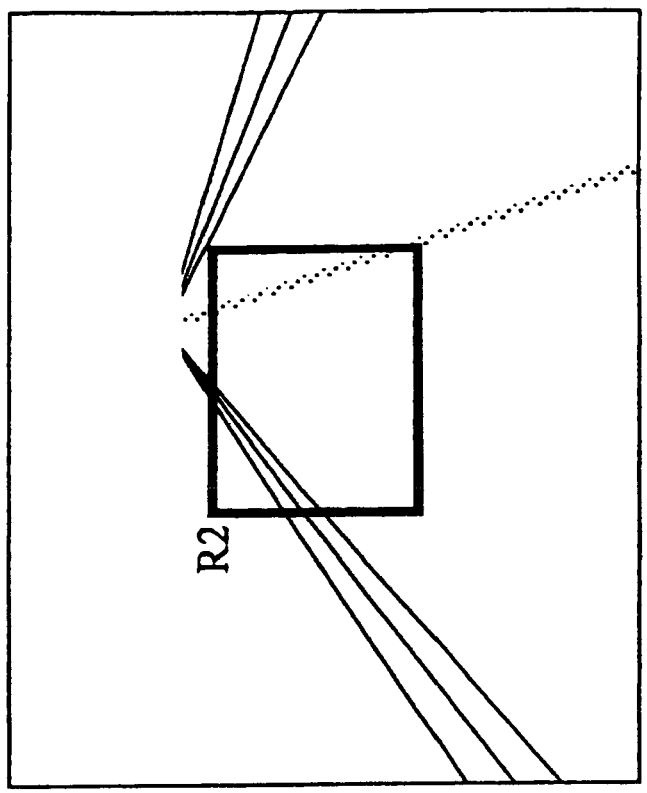
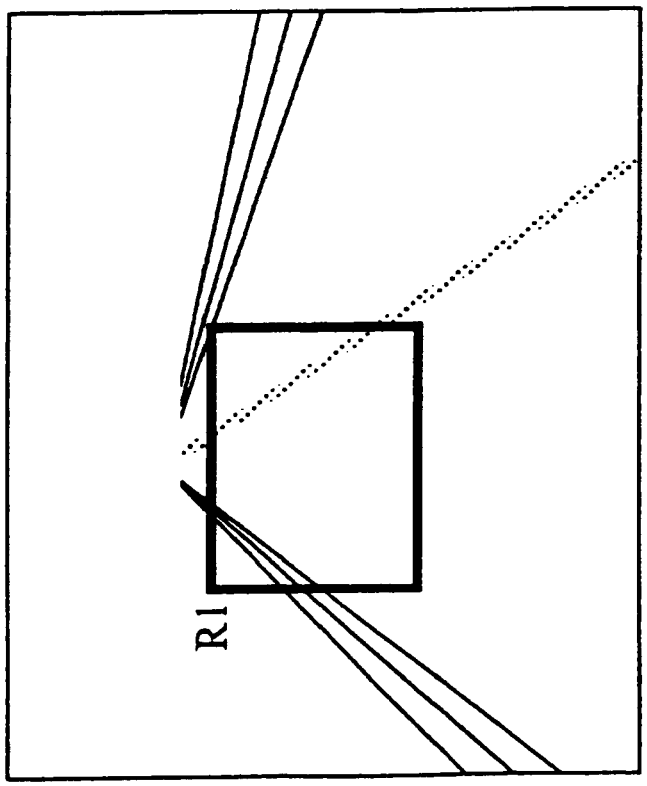
Fig. 5

Fig. 7
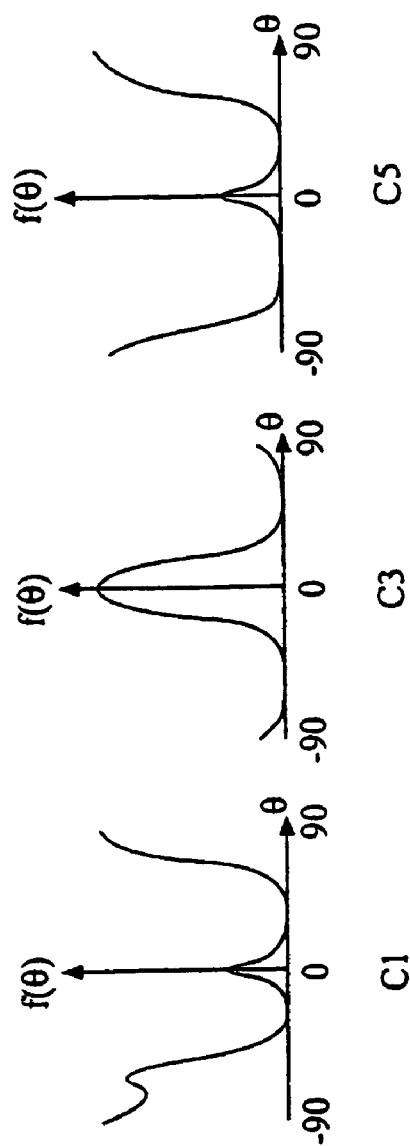
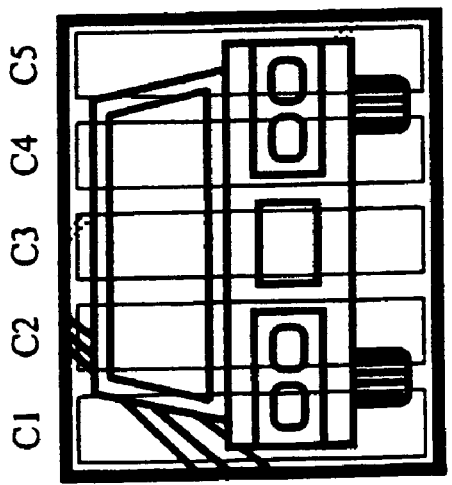

OBSTACLE DETECTING APPARATUS AND METHOD

CROSS-REFERENCE TO RELATED APPLICATIONS

This Application is a Division of application Ser. 10/387,465 filed on Mar. 14, 2003 now U.S. Pat. No. 7,091,837.

This application is based upon and claims the benefits of priority from the prior Japanese Patent Application No. 2002-97627 filed on Mar. 29, 2002; the contents of which are incorporated herein by reference.

BACKGROUND

The present invention relates chiefly to obstacle detecting apparatus and method for detecting an obstacle present on the road, such as a vehicle running ahead, a parked vehicle, and a pedestrian, through the use of a camera mounted on the vehicle, in order to assist safe driving and achieve automatic driving of the vehicle.

There are known two methods employed to detect an obstacle present on the road: one uses an active sensor, such as a laser range finder, an ultrasonic sonar, and a millimeter wave radar, and the other uses a passive sensor, such as a visible-light CCD camera and an infrared camera.

The active sensor is used to determine the position of a given object for various purposes, and its usefulness has been widely known. However, when used for the purpose of detecting an object causing obstruction to driving of the vehicle, such as another vehicle on the road, the active sensor has problems as follows: it has low detection resolution; it cannot cover a sufficient measuring range; it erroneously detects an object on the road other than an obstacle; and, because of the inability to detect each driveway lane, it erroneously detects an object along the roadside that would cause no obstruction. Thus, in order to solve these problems, there has been a need for a sophisticated obstacle detecting technique through image analysis using a passive sensor, such as a CCD camera.

Broadly speaking, the method of detecting an obstacle through analysis of an image sent from a CCD camera or the like mounted on the vehicle may be deemed as a method of detecting an obstacle or recognizing the driving lane from luminance pattern information of the image. The driveway lane may be detected through the use of an image sent from a single camera by extracting a gray portion where the texture is less dense.

In practice, however, many obstacles have luminance or patterns similar to those of the road, which makes it difficult to achieve a highly practical obstacle detecting apparatus capable of operating with less erroneous detection.

On the contrary, a method, generally referred to as the stereo vision, using a plurality of cameras has been employed to detect an obstacle and the driveway lane.

According to the stereoscopic-view method, three-dimensional information within a detection target range can be obtained, and achievement of highly accurate obstacle detection or lane detection is expected. However, a problem of this method is that, in general, a correspondence search to find a single point in the real world appearing in a plurality of camera images cannot be performed in a univocal manner. In this regard, methods disclosed in JP-2001-76128A and JP-2000-293693A (Japanese unexamined patent publications No. 2001-76128 and 2000-293693) eliminate the need of the correspondence search, and therefore, are quite advantageous in achieving the lane detection and the like.

However, in a case where there is parallax in the guardrail along the roadside, or in the texture like the white line or signs on the road surface due to the slope or change in the pitching angle of the vehicle, there arises a problem that the guardrail and the texture on the road surface, neither of which causes obstruction to driving of the vehicle, is detected erroneously as an obstacle. Also, in the case of rainy weather, there is a problem that raindrops adhering to the windshield or the lens surface of the camera are erroneously detected as an obstacle.

BRIEF SUMMARY OF THE INVENTION

The invention is devised in view of the foregoing, and therefore, is addressed to reduce the occurrence of erroneous detection described as above and thereby upgrade the performance of an obstacle detecting apparatus substantially by comparing features found in a plurality of camera images, or calculating an indicator indicating whether the image feature is derived from an obstacle.

A first aspect of the invention provides an obstacle detecting apparatus for detecting whether there is an obstacle within a common range shot through the use of a plurality of image pick-up devices. The obstacle detecting apparatus includes: image input means for receiving a plurality of images inputted respectively from the plurality of image pick-up devices; feature calculating means for calculating a predetermined, specific feature quantity in each of the plurality of input images: feature comparing means for finding a difference in the calculated feature quantity between the plurality of input images; and result judging means for judging whether there is an obstacle within the range based on a result of comparison of the found difference in the calculated feature quantity with a threshold.

A second aspect of the invention provides an obstacle detecting apparatus for detecting whether there is an obstacle within a range shot through the use of at least one image pick-up device. The obstacle detecting apparatus includes: image input means for receiving an image inputted from the image pick-up device; feature calculating means for calculating a predetermined, specific feature quantity in the input image; indicator calculating means for calculating an indicator indicating one of presence and absence of an obstacle based on a distribution of the calculated feature quantity; and result judging means for judging one of the presence and absence of an obstacle based on the calculated indicator.

A third aspect of the invention provides an obstacle detecting apparatus for detecting whether there is an obstacle within a common range shot through the use of a plurality of image pick-up devices. The obstacle detecting apparatus includes: image input means for receiving a plurality of images inputted respectively from the plurality of image pick-up devices; feature calculating means for calculating a predetermined, specific feature quantity in each of the plurality of input images; feature comparing means for finding a difference in the calculated feature quantity between the plurality of input images, and for synthesizing an image by combining the plurality of input images based on a result of comparison of the found difference in the calculated feature quantity with a threshold; indicator calculating means for calculating an indicator indicating one of presence and absence of an obstacle based on a distribution of a feature quantity in the synthesized image; and result judging means for judging one of the presence and absence of an obstacle based on the calculated indicator.

A fourth aspect of the invention provides an obstacle detecting apparatus according to any of the first through third aspects, and the feature calculating means calculates a luminance gradient at each pixel in each image and uses the luminance gradient as the feature quantity.

A fifth aspect of the invention provides a method of detecting an obstacle for detecting whether there is an obstacle within a common range shot through the use of a plurality of image pick-updevices. The method includes: an image inputting step of receiving a plurality of images inputted respectively from the plurality of image pick-up devices; a feature calculating step of calculating a predetermined, specific feature quantity in each of the plurality of input images; a feature comparing step of finding a difference in the calculated feature quantity between the plurality of input images; and a result judging step of judging whether there is an obstacle within the range based on a result of comparison of the found difference in the calculated feature quantity with a threshold.

A sixth aspect of the invention provides a method of detecting an obstacle for detecting whether there is an obstacle within a range shot through the use of at least one image pick-up device. The obstacle method includes: an image inputting step of receiving an image inputted from the image pick-up device; a feature calculating step of calculating a predetermined, specific feature quantity in the input image; an indicator calculating step of calculating an indicator indicating one of presence and absence of an obstacle based on a distribution of the calculated feature quantity; and a result judging step of judging one of the presence and absence of an obstacle based on the calculated indicator.

A seventh aspect of the invention provides a method of detecting an obstacle for detecting whether there is an obstacle within a common range shot through the use of a plurality of image pick-up devices. The method includes: an image inputting step of receiving a plurality of images inputted respectively from the plurality of image pick-up devices; a feature calculating step of calculating a predetermined, specific feature quantity in each of the plurality of input images; a feature comparing step of finding a difference in the calculated feature quantity between the plurality of input images, and for synthesizing an image by combining the plurality of input images based on a result of comparison of the found difference in the calculated feature quantity with a threshold; an indicator calculating step of calculating an indicator indicating one of presence and absence of an obstacle based on a distribution of a feature quantity in the synthesized image; and a result judging step of judging one of the presence and absence of an obstacle based on the calculated indicator.

An eighth aspect of the invention provides a computer-executable program for a method of detecting an obstacle for detecting whether there is an obstacle within a common range shot through the use of a plurality of image pick-up devices. The program causes a computer to perform: an image inputting function of receiving a plurality of images inputted respectively from the plurality of image pick-up devices; a feature calculating function of calculating a predetermined, specific feature quantity in each of the plurality of input images; a feature comparing function of finding a difference in the calculated feature quantity between the plurality of input images; and a result judging function of judging whether there is an obstacle within the range based on a result of comparison of the found difference in the calculated feature quantity with a threshold.

A ninth aspect of the invention provides a computer-executable program for a method of detecting an obstacle for detecting whether there is an obstacle within a range shot through the use of at least one image pick-up device. The program causes a computer to perform: an image inputting function of receiving an image inputted from the image pick-up device; a feature calculating function of calculating a predetermined, specific feature quantity in the input image; an indicator calculating function of calculating an indicator indicating one of presence and absence of an obstacle based on a distribution of the calculated feature quantity; and a result judging function of judging one of the presence and absence of an obstacle based on the calculated indicator.

A tenth aspect of the invention provides a computer-executable program for a method of detecting an obstacle for detecting whether there is an obstacle within a common range shot through the use of a plurality of image pick-up devices. The program causes a computer to perform: an image inputting function of receiving a plurality of images inputted respectively from the plurality of image pick-up devices; a feature calculating function of calculating a predetermined, specific feature quantity in each of the plurality of input images; a feature comparing function of finding a difference in the calculated feature quantity between the plurality of input images, and for synthesizing an image by combining the plurality of input images based on a result of comparison of the found difference in the calculated feature quantity with a threshold; an indicator calculating function of calculating an indicator indicating one of presence and absence of an obstacle based on a distribution of a feature quantity in the synthesized image; and a result judging function of Judging one of the presence and absence of an obstacle based on the calculated indicator.

BRIEF DESCRIPTION OF THE DRAWINGS

FIG. 4 is a schematic view explaining processing performed in a feature comparing unit when there is an obstacle;

FIG. 5 is a schematic view explaining processing performed in the feature comparing unit when there is no obstacle;

FIG. 7 is a schematic view explaining processing performed in an indicator calculating unit when there is an obstacle;

DETAILED DESCRIPTION OF THE INVENTION

First Embodiment

An obstacle detecting apparatus 10 according to a first embodiment of the invention will now be explained with reference to FIGS. 1 through 5.

Figure 1:
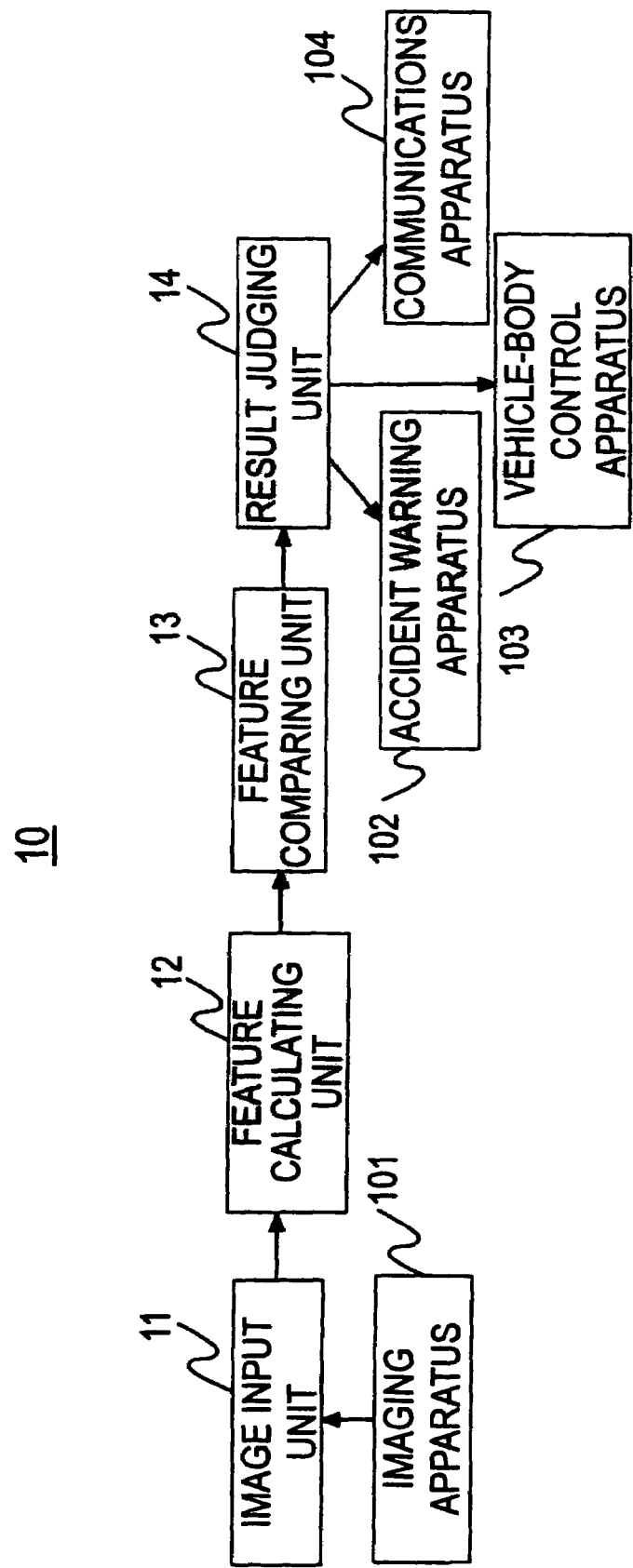
FIG. 1 is a view schematically showing an arrangement of an obstacle detecting apparatus according to a first embodiment of the invention.

FIG. 1 is a view schematically showing an arrangement of the obstacle detecting apparatus 10 of the present embodiment.

The obstacle detecting apparatus 10 includes an image input unit 11, a feature calculating unit 12, a feature comparing unit 13, and a result judging unit 14.

Respective functions of these units 11 through 14 as described below are implemented by running a program stored in a computer, such as a personal computer.

(1) Image Input Unit 11

Figure 2:
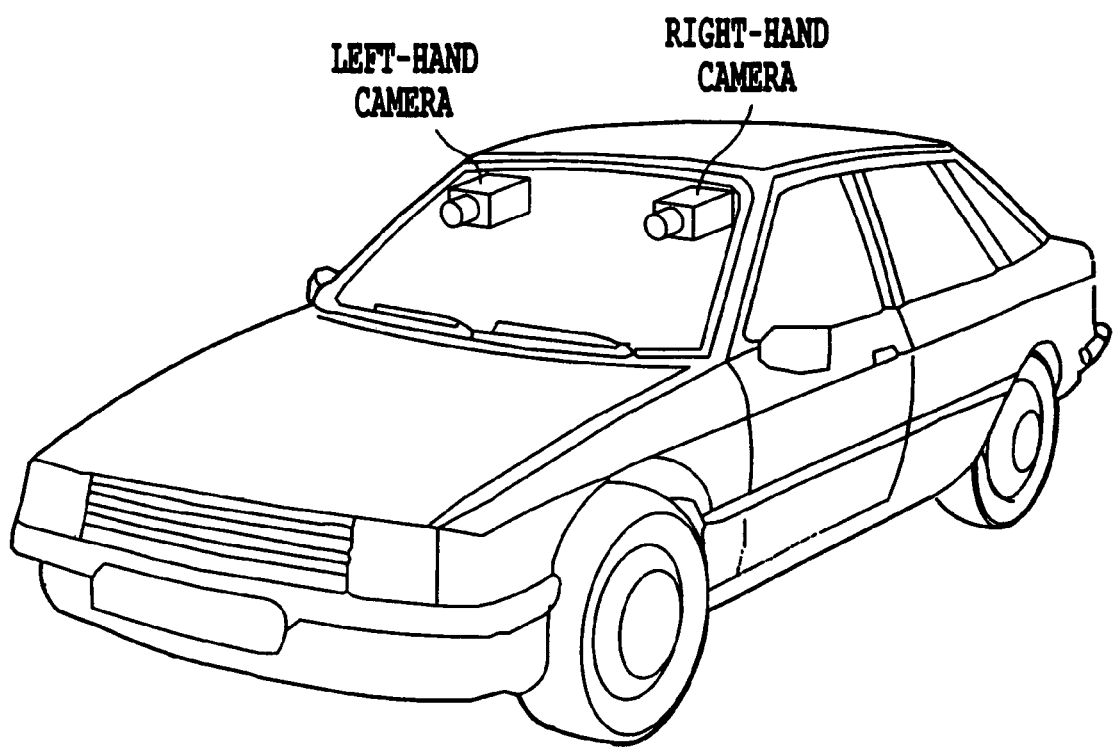
FIG. 2 is a schematic view showing image pick-up devices mounted on a vehicle.

The image input unit 11 is supplied with images from an arbitrary imaging apparatus 101. The imaging apparatus 101 includes a plurality of image pick-up devices, such as CCD cameras, which are, for example, as shown in FIG. 2, attached to two portions at the right front and the left front of the vehicle.

The image input unit 11 sequentially converts analog video signals outputted continuously from the image pick-up devices into digital signals, and stores the converted digital signals into an internal memory as digital images or time-series images. The image input unit 11 outputs a requested image at a given time within a given region, to the feature calculating unit 12 in the next stage.

(2) Feature Calculating Unit 12

The feature calculating unit 12 calculates a predetermined, specific feature quantity in an image or an image sequence sent from the image input unit 11 at a given time within a given region.

The feature quantity referred to herein is defined as any specific information that can be found at the respective pixels or within a given region.

To name a few by way of example, it can be simple information such as a luminance value or color information of the pixel, or alternatively, it can be any scalar quantity or vector quantity that can be calculated from an image, such as the result of differentiation or integration with respect to a space or time, the result of applying of an arbitrary filter, a statistic quantity like average or variance, the result of detection of a given object or image segmentation, and a feature quantity or a motion quantity within the region obtained from the result of object detection or image segmentation.

Herein, an explanation will be given to a case where the luminance gradient at the pixel position is used as the feature quantity.

The luminance gradient is the rate at which luminance changes in the vicinity of the pixel, and it takes a greater value at the boundary of an object or at the boundary of the structure inside the object appearing in an image (also referred to simply as the edge).

Figure 3:
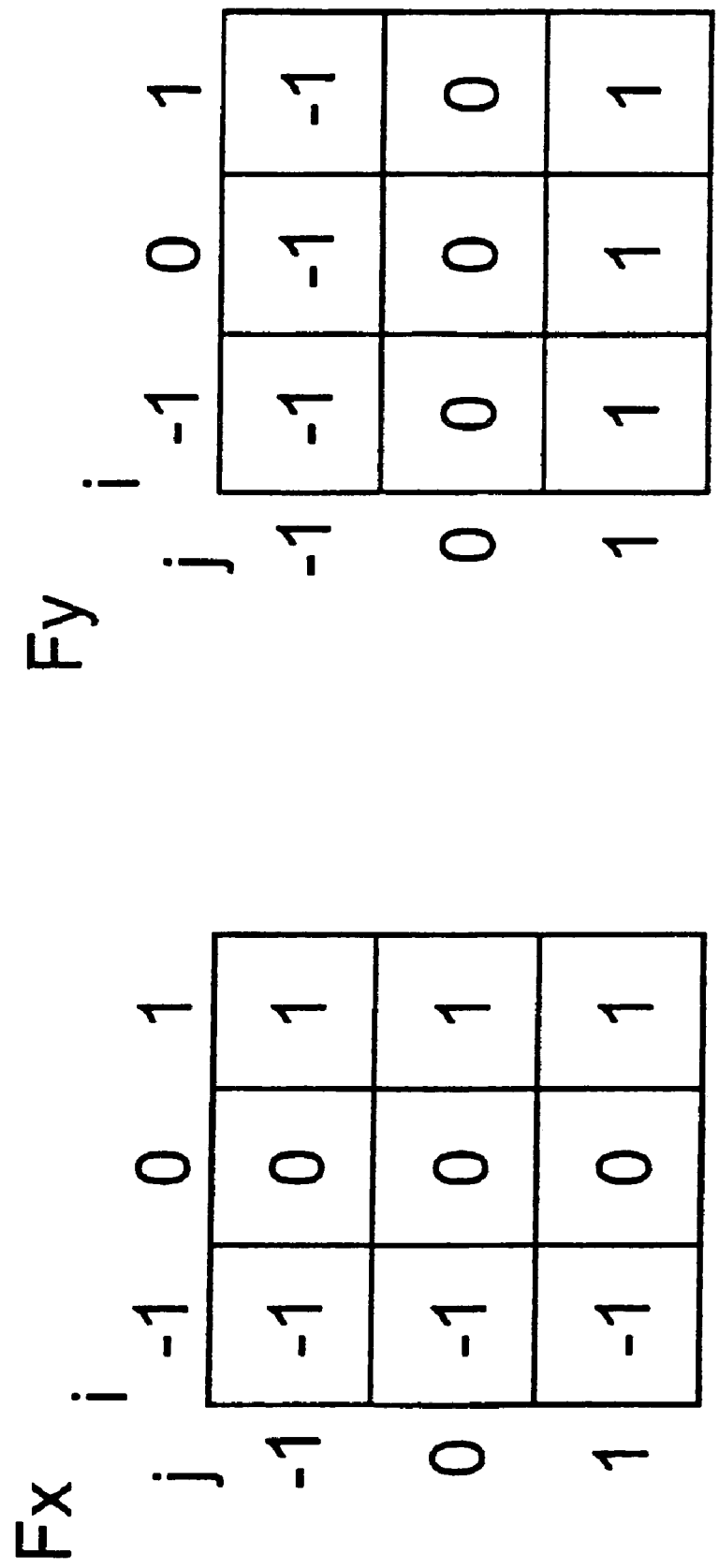
FIG. 3 is a schematic view showing a method of finding a luminance gradient in a feature calculating unit.

A filter employing, for example, the Sobel operator technique is applied on an image as a method of finding the luminance gradient, which will be explained briefly with reference to FIG. 3.

Let I(x, y) be the luminance value at the-position (x, y) in the image and each element value Fx(i, J) of the filter be as set forth in the view at the left side of FIG. 3, then a value obtained by superimposing the filter on the image is found in accordance with Equation 1 as follows:

$$Dx(x, y) = \sum_{i,j=-1,0,1} I(x+i, y+i)Fx(i, j)$$

Because the value Dx thus found increases when the luminance changes in the horizontal direction in the vicinity of the position (x, y), the luminance gradient in the horizontal direction can be found from the value Dx.

Likewise, let each element value Fy(i, j) of the filter be as set forth in the view at the right side of FIG. 3, then the luminance gradient in the vertical direction can be found in accordance with Equation 2 as follows:

$$Dy(x, y) = \sum_{i,j=-1,0,1} I(x+i, y+i)Fy(i, j)$$

Hence, $(Dx^2+Dy^2)^{1/2}$ is obtained as the intensity of the luminance gradient, and $\tan^{-1} Dy/Dx$ is obtained as the direction of the luminance gradient.

Besides the filter employing the Sobel operator technique, various types of filters can be used to find the luminance gradient, including a Laplacian filter, a Robinson filter, and a Canny filter, etc., and any type of filter can be used.

Also, the luminance gradient may be found through a statistic technique, such as Hough transformation.

Many methods are known as the method of calculating the luminance gradient, and, for example, are detailed in, "Handbook of Image Analysis" ed. by Takada and Shimoda, (University of Tokyo Press, ISRN4-13-061107-0,).

(3) Feature Comparing Unit 13

The feature comparing unit 13 compares feature quantities in images from a plurality of image pick-up devices, obtained in the feature calculating unit 12, and thereby extracts only the feature derived from an obstacle from the images.

FIGS. 4 and 5 are schematic views of images being processed. FIGS. 4 and 5 show examples of images obtained from the respective cameras mounted as shown in FIG. 2. These cameras are attached in parallel to the vehicle's moving direction to face forward.

FIG. 4 shows a case where there is an obstacle (in the example of the drawing, a vehicle running ahead) ahead of the vehicle in question. The view at the left side is an example of an image (left camera image) from the camera (left camera) mounted on the vehicle at the left side, and the view at the right side is an example of an image (right camera image) from the camera (right camera) mounted on the vehicle at the right side.

FIG. 5 shows a case where there is no obstacle. As with FIG. 4, the view at the left side and the view at the right side are examples of images (left and right camera images) from the left camera and the right camera, respectively.

Assume that rectangles R1 and R2 indicated by a bold line in each drawing are set as candidate regions to be used as the targets of obstacle detection processing, so that a judgment is made as to whether there is an obstacle within the candidate regions.

As shown in FIG. 4, in a case where there is an obstacle within the candidate regions, if the candidate regions are set properly to parallax corresponding to a distance between the cameras and the obstacle, the same luminance pattern (in this example, the backside of the vehicle running ahead) derived from the obstacle appears in both the candidate regions at the right and left sides. The parallax referred to herein is defined as a change of the position of an object image with respect to the background image caused from a difference in position between the cameras when a given object is shot by a plurality of cameras. In the example of the drawing, it is equivalent to a phenomenon that the position of the image of the vehicle running ahead in the view at the right side is shifted to the right side from the position in the view at the left side because the optical axes of the right and left cameras are set in parallel to the vehicle's moving direction.

Further, assume that the distance between the cameras and the obstacle in this example is sufficiently large in comparison with differences in distance among respective points inside the obstacle (irregularities on the backside of the vehicle running ahead), then the parallax caused inside the obstacle is negligible. Hence, the luminance patterns derived from the obstacle and appearing in the right and left camera images simply move in parallel to each other while keeping nearly constant parallax.

On the contrary, in a case where there is no obstacle as shown in FIG. 5, the luminance patterns appearing in the candidate regions at the right and left sides have a difference.

This is because a mere object causing no obstruction within each candidate region (in FIG. 5, the white line on the road surface, the structure along the road, such as the guardrail) extends far ahead in the depth (sight line) direction to the extent of being not negligible with respect to the distance between the cameras and the object, and the parallax inside the object varies considerably in response to the distance.

By exploiting the nature that an obstacle and objects other than an obstacle appear differently due to parallax, the feature comparing method such that selectively outputs the image feature of an obstacle having a vertical (deemed as vertical) surface with respect to the vehicle's moving direction can be achieved through a method, described by way of example, as follows.

Assume that the candidate region R1 set within the left camera image and the candidate region R2 set within the right camera image are set to be of the same size, then the pixel position (x, y) is given commonly as the pixel position with reference to the candidate region RI and the pixel position with reference to the candidate region R2.

Let F1 and F2 be the feature quantities calculated in the feature calculating unit 12 at the pixel position (x, y) in the left and right camera images, respectively, then a difference in feature quantity at the pixel position (x, y) is defined by Equation 3 as follows:

$$D=\|F1-F2\|$$

Accordingly, only the feature derived from an obstacle can be outputted by outputting those having a small difference in feature quantity.

The white line and guardrail, neither of which causes no obstruction to normal driving of the vehicle, have an extensive depth (length) with respect to the vehicle's moving direction, and parallax thus changes noticeably in response to the distance. This causes a considerable difference in angel between projected images of a given object between the right and left camera images. On the contrary, the images of an obstacle, such as a vehicle running ahead, merely move almost in parallel to each other in the right and left camera images, and the images seldom have a difference in angle.

Accordingly, in order to distinguish an obstacle from a mere object causing no obstruction, one of effective methods would be to find the directions of the luminance gradients of the object images in the right and left camera images and to use a difference in direction thus found. Assume that the luminance gradients have been already found in the feature calculating unit 12 as with the example described above, then the simplest example of a difference in feature quantity is defined as Equation 4 as follows:

$$D(x, y)=|d1(x, y)-d2(x, y)|$$

where d1(x, y) is the direction of the luminance gradient and d2(x, y) is the direction of the luminance gradient at the pixel position (x, y) in the candidate region R1 and R2 (within the left and right camera images), respectively.

Also, a Euclidean distance between the feature vectors f1(x, y) and f2(x, y) using the intensity and the direction of the luminance gradient as elements is found in accordance with Equation 5 as follows:

$$\|f1(x, y)-f2(x, y)\|$$

In this case, not only can a geometric difference in feature quantity be used, but also any quantity calculated through the use of arbitrary feature quantities F1(x, y) and F2(x, y) calculated in the feature calculating unit 12 can be used as a difference D in feature quantity.

The feature comparing unit 13 calculates the difference D in feature quantity at a given pixel (x, y), and outputs the calculated value itself or a quantity determined uniquely with respect to the difference D for the given pixel (x, y).

(4) Result Judging Unit 14

The result judging unit 14 judges whether there is an obstacle within the camera images or within the image regions to be used as the targets of judgment through the use of the image feature derived from an obstacle, obtained in the feature comparing unit 13.

Assume that the feature comparing unit 13 outputs a large pixel value I(x, y) when the difference D(x, y) in feature quantity at the pixel (x, y) within the candidate regions R is small and neglects pixels from which no feature is obtained, then the presence or absence of an obstacle can be judged by finding a sum of the pixel values I within the candidate regions R in accordance with Equation 6 as follows:

$$S = \sum_{(x,y)\in R} I(x, y)$$

When there is an obstacle, such as a vehicle, ahead of the vehicle in question, the sum S increases because there are many pixels having small differences D in feature quantity. Conversely, in a case where there is no obstacle, such as a vehicle, and the guardrail and the road surface are the only images appearing in the candidate regions R1 and R2 (within the left and right camera images), the sum S decreases because there are fewer pixels having small differences D in feature quantity.

Hence, by setting a threshold th and then comparing the threshold th with the sum S, the presence or absence of an obstacle can be readily judged.

Any value calculated through the use of the difference D in feature quantity obtained in the feature comparing unit 13 can be used as the judging method.

When the result judging unit 14 judges the presence of an obstacle, a warning may be given to the driver through an accident warning apparatus 102, or the vehicle-body control may be effected by applying the brakes or steering through a vehicle-body control apparatus 103. Alternatively, the result may be outputted or transferred to an arbitrary apparatus, such as a communications apparatus 104.

It should be noted that the threshold th does not have to remain at a constant value for all the pixels in the candidate regions R all the time. The value may be varied from pixel to pixel or from time to time through a predetermined method. Alternatively, it may be changed on the basis of an arbitrary quantity (scalar quantity or vector quantity) found from the camera images.

(5) Obstacle Detection in Rainy Weather

Obstacle detection in the rainy weather will now be discussed.

When raindrops adhere to the windshield of the vehicle or the lens surfaces of the cameras mounted thereon, the conventional obstacle detection has a high risk of causing a serious error that the image of raindrops is erroneously detected as an obstacle or the image makes the result of obstacle detection incorrect.

On the contrary, in a case where the feature quantities are compared between a plurality of camera images as with the first embodiment, there is a low probability (chances) that raindrops that look alike simultaneously adhere to the positions corresponding to specific parallax in all the camera images. Hence, there is a sufficiently high probability that the camera images have a large difference in feature quantity at the image portions where the raindrops are adhering. The frequency of erroneous detection caused by the images of raindrops can be thus reduced effectively.

(6) First Modification

The candidate regions are rectangles in the first embodiment. It should be appreciated, however, that the candidate regions can be of any predetermined shape.

Also, the explanation was given on the assumption that the candidate regions R1 and R2 are pre-set in the left and right camera images, respectively. However, the obstacle detecting method described in JP-2002-352225A(Japanese Patent Application No. 2001-154569) maybe adopted as pre-processing, so that the candidate regions are set on the basis of the result of pre-processing. Alternatively, any drive way lane detecting method may be adopted, so that the candidate regions are set through a predetermined method on the basis of the result of the driveway lane detection.

(7) Second Modification

Further, even when the candidate regions are not set in advance, if the right and left camera images are scanned at different positions, virtually the same manipulation as that of the first embodiment is performed at the respective scanned positions. Accordingly, the same obstacle detection processing can be performed.

As has been discussed, in a case where an obstacle is detected through analysis of images obtained from image pick-up devices, such as CCD cameras, it is possible to prevent the texture of the road surface or the guardrail appearing in the obtained images, which are mere objects practically causing no obstruction to driving of the vehicle, from being detected erroneously as an obstacle, such as a vehicle running ahead, which allows the obstacle alone to be detected accurately. It is thus possible to substantially reduce the occurrence of malfunctions, such as giving a warning erroneously or effecting unnecessary vehicle-body control.

Second Embodiment

An obstacle detecting apparatus 20 according to a second embodiment of the invention will now be explained with reference to FIGS. 6 through 8.

Figure 6:
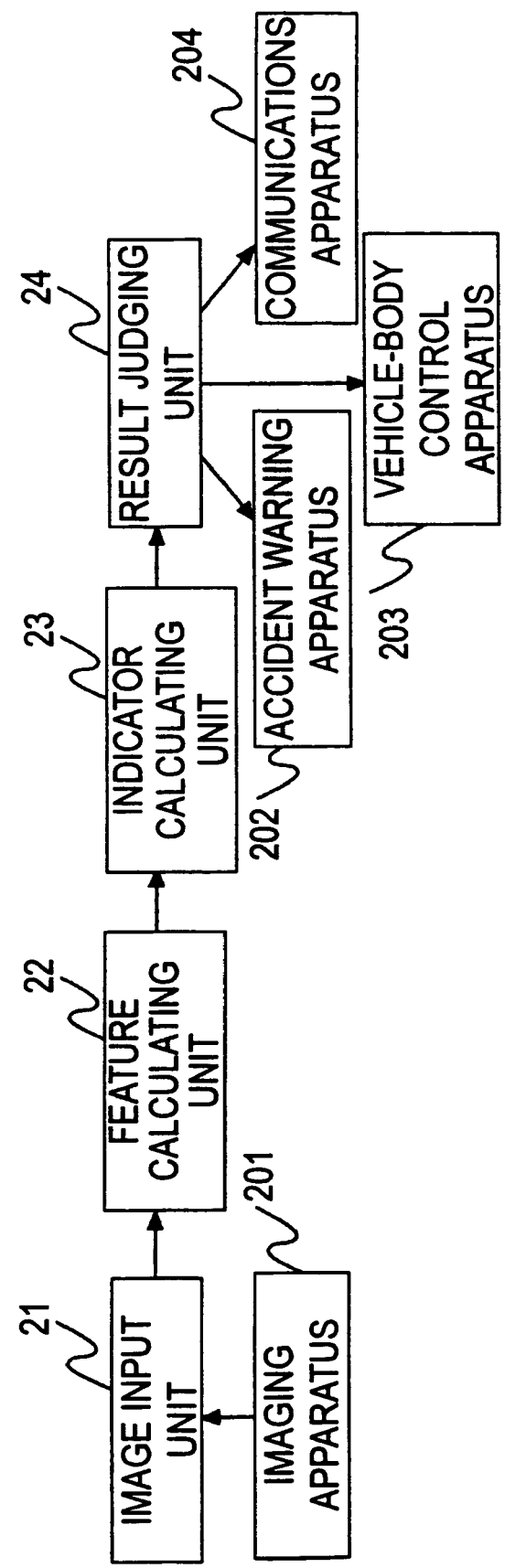
FIG. 6 is a view schematically showing an arrangement of an obstacle detecting apparatus according to a second embodiment of the invention.

FIG. 6 is a view schematically showing an arrangement of the obstacle detecting apparatus 20 of the present embodiment.

The obstacle detecting apparatus 20 includes an image input unit 21, a feature calculating unit 22, an indicator calculating unit 23, and a result judging unit 24.

As with the first embodiment above, the image input unit 21 is supplied with images from an arbitrary imaging apparatus 201 or the like. In the second embodiment, however, feature quantities of images obtained from a plurality of image pick-up devices need not be compared, and for this reason, the imaging apparatuses 201 do not necessarily include a plurality of image pick-up devices, and it may be sufficient to include only a single image pick-up device.

Also, the image input unit 21 and the feature calculating unit 22 of the present embodiment may be identical with their respective counterparts in the first embodiment above.

(1) Indicator Calculating Unit 23

The indicator calculating unit 23 calculates an indicator indicating whether the image feature is derived from an obstacle using the feature quantity in the image obtained in the feature calculating unit 22.

Figure 8:
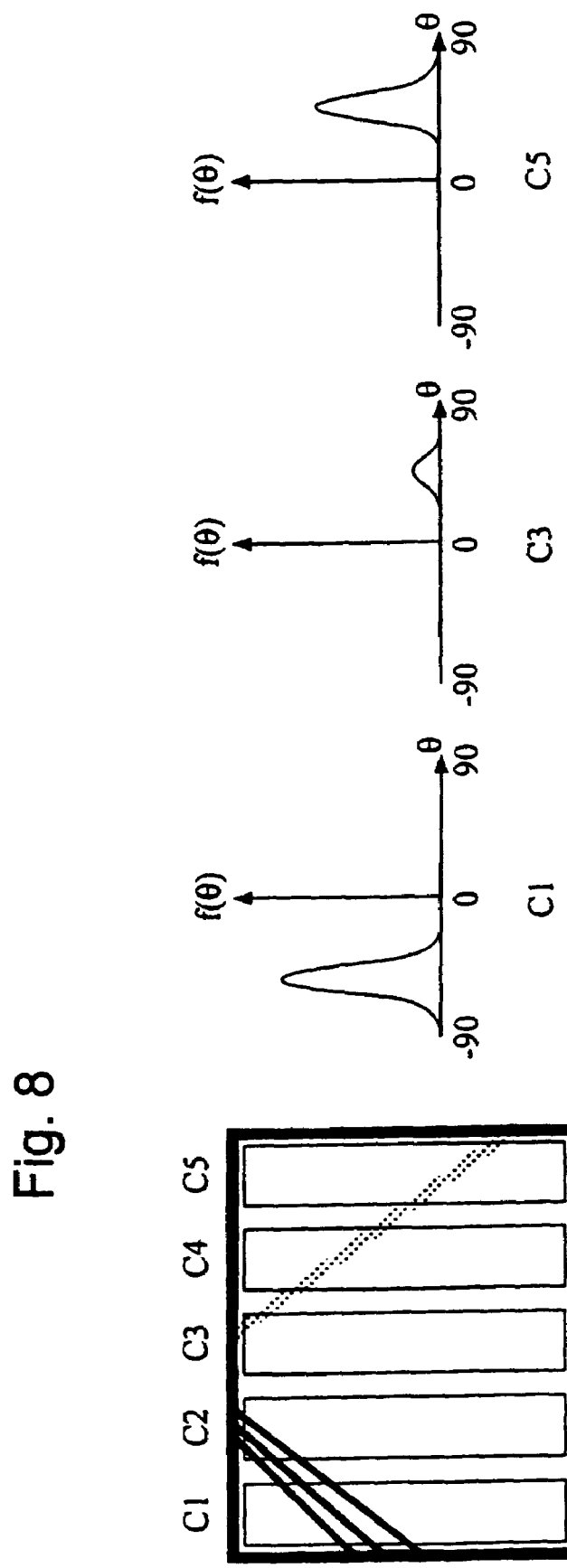
FIG. 8 is a schematic view explaining processing performed in the indicator calculating unit when there is no obstacle.

FIGS. 7 and 8 are schematic views showing images being processed.

As with the first embodiment above, assume that a candidate region R is pre-set within the camera image, and the luminance gradient is used as the image feature. FIG. 7 shows the candidate region R in the presence of an obstacle (in this example, a vehicle running ahead), and FIG. 8 shows the candidate region R in the absence of an obstacle.

The indicator calculating unit 23 finds an indicator P used to judge the result, using element indicators Pn found in a plurality of element segments Cn (n=1, . . . , N) pre-set within the candidate region R, and outputs the indicator P thus found to the result judging unit 24 in the next stage.

A method of calculating the indicator P and how the indicator P is used will now be explained with reference to FIG. 7.

(1-1) Setting of Element Segments Cn

As shown in FIG. 7, five portrait rectangles are set within the candidate region R in the camera image as the element segments Cn.

(1-2) Calculation of Element Indicators Pn

The element indicators Pn are found from frequency distributions (histograms) of the directions of the luminance gradients in the respective element segments Cn. As examples of such histograms, C1, C3, and C5 are shown in FIG. 7.

Let the horizontal direction be 0° and the clockwise direction be the normal direction, then the direction $\theta$ of the luminance gradient is a plot of the appearance frequency $f(\theta)$ of the luminance gradient in a given element segment Cn at the angle $\theta$ in the range of $-90° \leq \theta \leq 90°$.

Accordingly, the histograms show direction distributions of the luminance gradients or edges seen often in the respective element segments Cn.

For example, the both ends of the vehicle are shown in the element segments C1 and C5, and the edges in the vertical direction thus become noticeable, which increases the value of f(90) or f(−90).

On the contrary, an image at the center of the vehicle is shown in the element segments C2 through C4, and the edges in the horizontal direction thus become noticeable, which increases the value of f(0).

In other words, if the element indicators Pn are predetermined such that Pn=f(90) or Pn=f(−90) when n=1, 5, and Pn=f(0) when n=2, 3, 4, then the values of the element indicators Pn increase in all the element segments Cn only when there is an obstacle.

Here, the element indicators Pn may be determined through the methods as follows.

A first method is a method that directly uses the value of f(θ) at a given angle θ determined for each element indicator Pn as described above.

A second method is a method that takes a statistic quantity, such as the maximum value or an average value of f(θ) for the angle θ within a specific range.

For example, the range of the angle θ is $-90° \leq \theta \leq -70°$ or $70° \leq \theta \leq 90°$ when n=1, 5, and $-30° \leq \theta \leq 30°$ when n=2, 3, 4.

(1-3) Calculation of Indicator P

When the histograms are normalized by the total cumulative frequency, the result can be deemed as the probability distribution of the edge direction.

For this reason, the indicator P, which is deemed as the joint likelihood indicating the presence of an obstacle, can be found in accordance with Equation 7 as follows:

$$P = \prod_n Pn$$

(1-4) Use of Indicator P

In a case where the indicator P is found as described above, when there is no obstacle as shown in FIG. 8, the respective element indicators Pn are nearly 0 regardless of the value of n, and so is the indicator P.

On the contrary, the indicator P takes a greater value than 0 in the presence of an obstacle. Hence, the indicator P can be used as an indicator indicating whether the image feature is derived from an obstacle, that is, an indicator indicating whether there is an obstacle.

An indicator P' used to detect a mere object causing no obstruction, such as the guardrail and the white line on the road surface, may be calculated through the same method.

To be more specific, assume that a region enclosing only the element segments C1 and C2 of FIG. 8 is set as a candidate region R'.

Also, assume that the direction distributions of the luminance gradients in the element segments C1 and C2 have the peak in the vicinity of α° (in the drawing, α° is approximately 50°). Then, the indicator P' is calculated in accordance with Equation 8 as follows:

$$P' = \prod_n Pn$$

where Pn=f(α) and n=1, 2. Then, the indicator P' thus found an be used as an indicator indicating the presence of the guardrail or the white line at the left side of the road.

In addition, an indicator indicating the presence of the guardrail or the white line at the right side of the road can be calculated in the same manner. Hence, an indicator indicating the presence of a given object can be calculated on the basis of the feature distribution specific to the object in question.

(2) Result Judging Unit 24

The result judging 24 judges whether there is an obstacle within the camera image or the image region to be used as the target of judgment using the indicator P indicating the presence of an obstacle, obtained in the indicator calculating 23.

The presence or absence of an obstacle can be judged by setting a certain threshold th and then comparing the threshold th with the indicator P. Alternatively, the presence or absence of an obstacle may be judged by comparing the indicator P indicating the presence of an obstacle and the indicators P', P'', and so forth indicating, as described above, the presence of mere objects causing no obstruction.

The result of judgment in the result judging 24 may be transmitted to an arbitrary apparatus, such as an accident warning apparatus 202, a vehicle-body control apparatus 203, and a communications apparatus 204.

As has been described above, an obstacle, such as a vehicle running ahead, is distinguished from a mere object practically causing no obstruction to driving of the vehicle, such as patterns on the road surface or the guardrail appearing in the camera image, which allows the obstacle alone to be detected correctly. It is thus possible to substantially reduce the occurrence of malfunctions, such as giving a warning erroneously or effecting unnecessary vehicle-body control.

(3) First Modification

Any value calculated through the use of an arbitrary indicator P obtained in the indicator calculating 23 can be used as the judging method.

(4) Second Modification

Five rectangles of the same size are set as the element segments C in the second embodiment. It should be appreciated, however, that the number and the size of element segments C can be set as needed, and the element segments C may overlap one another.

(5) Third Modification

The explanation was given by using only the distribution of the luminance gradient as the image feature. It should be appreciated, however, that the distribution of any specific feature quantity or feature vector obtained in the feature calculating 22 can be used as well.

(6) Fourth Modification

The explanation was given to the method of finding the element indicators Pn through the use of the frequency value f(θ) at the angle θ determined in advance depending on the value of n. However, a method of finding the element indicators Pn may use an arbitrary statistic quantity, such as the most frequent value, the average value, the median value, and the sum of weighted values in a specific angle range, or a value obtained from an arbitrary equation of the value f(θ).

(7) Fifth Modification

A method of finding a feature quantity in a case where there are w (w is an integer equal to or greater than three) image pick-up devices will now be explained.

For example, by finding a variance value of the feature quantities in w camera images, variation among w feature quantities can be presented, and the variation in feature quantity thus found can be used as a difference in feature quantity.

Third Embodiment

An obstacle detecting apparatus 30 according to a third embodiment of the invention will now be explained.

Figure 9:
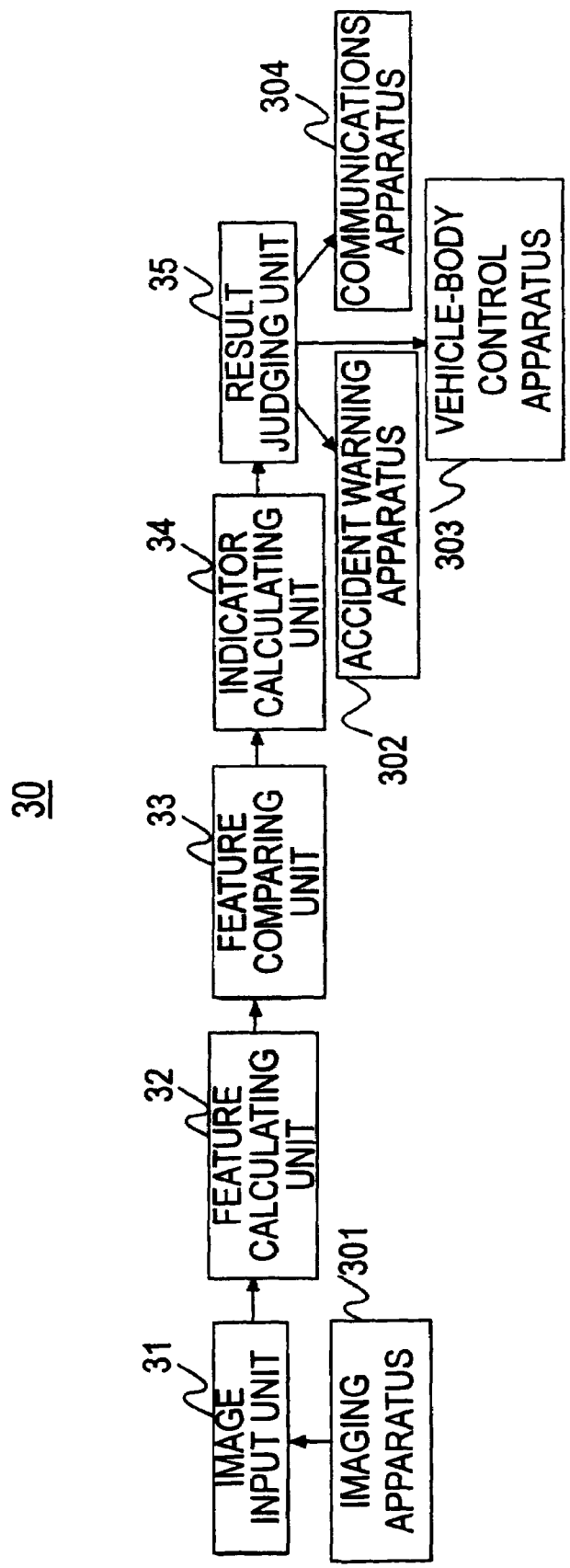
FIG. 9 is a view schematically showing an arrangement of an obstacle detecting apparatus according to a third embodiment of the invention.

FIG. 9 is a view schematically showing an arrangement of the obstacle detecting apparatus 30 of the present embodiment.

The obstacle detecting apparatus 30 includes an image input 31, a feature calculating 32, a feature comparing 33, an indicator calculating 34, and a result judging unit 35.

The image input 31, the feature calculating unit 32, and the feature comparing 33 are identical with their respective counterparts in the first embodiment above, and the indicator calculating 34 and the result judging 35 are identical with their respective counterparts in the second embodiment above.

However, in order to allow the feature comparing unit 33 and the indicator calculating 34 to operate in succession, the feature comparing 33 is furnished with an additional function as follows.

That is, let f1(x, y) and f2(x, y) be the feature quantities respectively in the candidate regions R1 and R2 within the left and right camera images at a given position (x, y) in each of the candidate regions R1 and R2, then when a difference D in feature quantity is smaller than the threshold th, a feature quantity f(x, y) is synthesized by combining the feature quantities f1(x, y) and f2(x, y) and then outputted; otherwise, 0 is outputted.

An example of a method employed to synthesize the feature quantity f may be as follows. That is, let f, f1, and f2 be the M-dimensional vector quantities (in the case of using the luminance gradient as the feature, the intensity and the direction of the luminance gradient are the elements of the vector), then the minimum value for each of the elements fm (m=1, 2, 3, . . . , M) forming the feature quantity f may be found as follows:

$$fm(x, y) = \min\{f1m(x, y), f2m(x, y)\}$$

Alternatively, any value calculated through the use of the feature quantities f1(x, y) and f2 (x, y) may be used as the synthesizing method.

As has been described, by allowing the feature comparing unit 33 and the indicator calculating unit 34 to operate in succession, an obstacle alone can be detected correctly in a more reliable manner. It is thus possible to substantially reduce the occurrence of malfunctions, such as giving a warning erroneously or effecting unnecessary vehicle-body control.

According to the invention, it is possible to reduce errors of the obstacle detecting apparatus, for example, a mere object causing no obstruction to driving of the vehicle, such as the guardrail along the roadside and textures like the white line or signs on the road surface, is erroneously detected as an obstacle, or raindrops adhering to the windshield or the lens surface of the cameras in the rainy weather are erroneously detected as an obstacle. Hence, there can be provided a great advantage in practical use by, for example, making it possible to substantially upgrade the performance of the obstacle detecting apparatus.

What is claimed:

1. An apparatus for detecting with at least one image pick-up device, whether there is any obstacle within a detectable area, said apparatus comprising:
   image input means for receiving an image from the image pick-up device;
   feature calculating means for calculating a luminance distribution along a luminance gradient at each pixel in each of a plurality of predetermined elementary regions in the image;
   indicator calculating means for calculating an elementary indicator from each luminance distribution and thereby obtaining a combined indicator of the elementary indicators of the elementary regions; and
   concluding means for concluding the presence of an obstacle when the combined indicator is equal to, or above a threshold value.

2. The apparatus of claim 1, wherein each of said elementary regions is a rectangular region extending longitudinally within said image.

3. A method for detecting with at least one pick-up device, whether there is any obstacle within a detectable area, said method comprising:
   inputting an image from said image pick-up device;
   calculating a luminance distribution along a luminance gradient at each pixel in each of a plurality of predetermined elementary regions in the image;
   calculating an elementary indicator from each luminance distribution and thereby obtaining a combined indicator of the elementary indicators of the elementary regions; and
   concluding the presence of an obstacle when the combined indicator is equal to, or above a threshold value.

4. A computer readable medium which stores a program for detecting with at least one pick-up device, whether there is any obstacle within a detectable area, said program when executed by a computer, causing the computer to perform steps of:
   inputting an image from said image pick-up device;
   calculating a luminance distribution along a luminance gradient at each pixel in each of a plurality of predetermined elementary regions in the image;
   calculating an elementary indicator from each luminance distribution and thereby obtaining a combined indicator of the elementary indicators of the elementary regions; and
   concluding the presence of an obstacle when the combined indicator is equal to, or above a threshold value.

* * * * *